Figure 1:
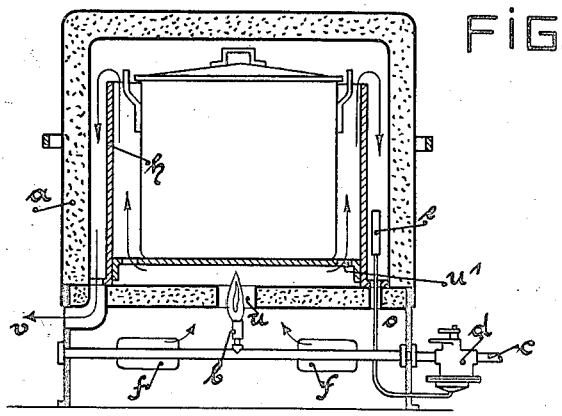

H. JUNKERS.
COOKING CHEST.
APPLICATION FILED NOV. 29, 1912.

1,194,638.

Patented Aug. 15, 1916.

Witnesses:
Emil Wergien
Hermann Fischer

Inventor:
Hugo Junkers

UNITED STATES PATENT OFFICE.

HUGO JUNKERS, OF AIX-LA-CHAPELLE, GERMANY.

COOKING-CHEST.

1,194,638.        Specification of Letters Patent.      Patented Aug. 15, 1916.

Application filed November 29, 1912. Serial No. 734,158.

*To all whom it may concern:*

Be it known that I, HUGO JUNKERS, professor at Aix-la-Chapelle, Germany, a subject of the King of Prussia, residing at No. 68 Bismarckstrasse, Aix-la-Chapelle, in the Kingdom of Prussia, Empire of Germany, have invented certain new and useful Improvements in Cooking-Chests; and I do hereby declare the following to be a full, clear, and exact description of the invention, such as will enable others skilled in the art to which it appertains to make and use the same.

The present invention relates to automatic cooking chests, analogous to the devices which are known as "fireless cookers", though being provided with a heating element. These devices have the great advantages that their use results in a great saving of fuel, and does not require the attendance of the cook or housewife, from the beginning to the end of the cooking operation. They suffer from the disadvantage, however, that the temperature within them cannot be constantly maintained for a long time, but continuously decreases unless a supplemental heating adjunct is provided, in which case it immediately becomes necessary for the cook or housewife to closely attend the cooking operation, and the device in reality becomes an ordinary stove. For the best cooking effects, the regulation of the temperature is, however, of essential importance, for, not only does the burning of the food have to be avoided, but also, as has been shown by recent research, the degree to which many foods are digestible, the best preservation of their nutritious value, and their palatability, are dependent upon subjecting them to definite uniform temperatures while cooking. In fact, certain foods become actually harmful to the human system if the temperature during the cooking operation is not kept between certain limits.

The object of the present invention is to make possible the necessary regulation of the cooking temperature, while at the same time maintaining the automatic characteristic of a fireless cooker, so that the cook can place the food in the cooking device, and having adjusted it properly, can rely upon the proper cooking of the food without any further attention. The amount of heat required to be added to a device of this character in any unit of time is extremely small, because of the fact that heat losses by radiation and convection are substantially prevented, and as a consequence of these conditions, an even distribution of the heat within a cooking chest of ordinary construction cannot be relied upon and the means provided for regulating the cooking temperature must be of such character that they will accommodate themselves to these conditions.

To this end there is employed an outer non-heat-conducting casing, having a separable portion constituting a cover, and containing partitions arranged to define a space available on the removal of the cover to receive a food-containing vessel, and also to cause a circulation of the heated gases about said space within the casing, together with a heater for raising the temperature within the casing, and automatic mechanism preferably adjustable for regulating the heater, the controlling device of the regulator being arranged within the casing in the path of the circulating gases, so that the attendant may set the temperature at the desired value with the assurance that this temperature will be maintained throughout the cooking operations, no supervision or temperature observations being necessitated. Moreover, since the governing device is actuated by the temperature in the interior of the cooking appliance, the external temperature has no influence whatsoever upon the action of the cooking device.

Figure 2:
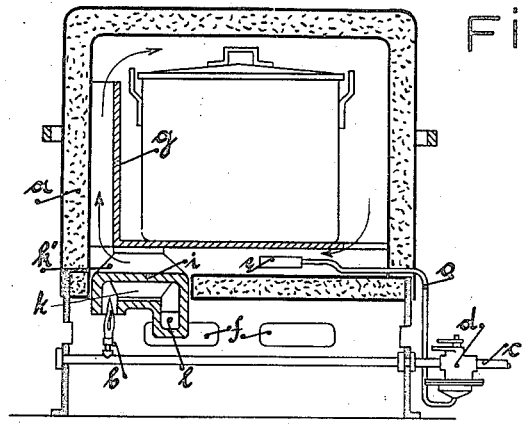

In the drawings, which illustrate two possible embodiments of the inventive idea, Figure 1 is a vertical section of an automatic cooking device having a heating burner and flues for the passage of the hot gases through the heating chamber of the cooker, and out, at a suitable outlet. Fig. 2 is a like section of a modified and preferred form of the invention in which the hot gases from the burner do not enter the cooking chamber, but their heat is transmitted to the air within that chamber through a suitable transmitting element.

In Fig. 1, the outer casing of the cooking chest is designated by the letter *a*, comprising a flat base or table portion and a removable hood or cover portion, both being of non-heat-conducting construction, as for instance, confining walls between which is packed a suitable non-conductor of heat in a finely divided state. The heater, which in this case is a gas-burner, is indicated by the reference letter *b*, and is supplied with gas through the supply main *c*, in which is interposed the regulator *d*, which regulator is controlled by the controlling adjunct *e*, within the cooking chamber. The inlets for the air necessary to support combustion are indicated by the reference letter *f*, and the interior of the chamber is divided up into tortuous passages for the hot products of combustion by the partitions *g*, which in this instance, have the form of an annular wall within which the receptacle for food, indicated by the reference letter *h*, is placed. It will be seen that the hot gases pass from the burner up the sides of the receptacle *h*, over the top of the annular wall *g*, and out at the outlet *u*. The controlling adjunct may be of any convenient type. For example, its action may be based upon the expansion of metals or upon the expansion of a liquid. The particular device shown is of the type disclosed in my United States Letters Patent No. 926194 of June 29th, 1909, and will not require further description herein.

The embodiment of the invention illustrated in Fig. 2 differs from that illustrated in Fig. 1, in that the hot gases do not pass through the heating chamber at all, but their heat is transmitted to the air within the heating chamber through a heat transmitting device, indicated by the reference letter *i*. This device has an inlet opening into which the flame of the burner extends, as shown, and an outlet, as indicated at *l*. Between the inlet and the outlet are located a series of metal vanes or partitions *k*, which absorb the heat from the gases and transmit it to a like series of partitions or vanes *k'* extending within the cooking chamber, and lying in the path of the air which circulates therein.

In either form of the invention, the amount of heat required for the cooking operation is very small, but in the form shown in Fig. 2, the saving is particularly great, in that substantially all of the heat can be drawn from the gases into the partitions *k*, and thence conducted to the air within the cooking chamber. Furthermore there is no possibility, in the case of the apparatus shown in Fig. 2, that the hot gases will ever come into contact with the material to be cooked, or that the heat will be unduly increased locally within the cooking chamber.

It will be observed that in both of the forms shown, the temperature controlling adjunct *e* is separated from the food receptacle by a partition which serves the double purpose of putting the controlling adjunct directly in the path of the hot air or gases, and of protecting it from breakage.

What I claim is:

1. A cooking chest of the character described, comprising a non-heat-conducting casing, having a separable portion constituting a cover, and containing partitions arranged to define a space available upon the removal of the cover to receive a food-containing vessel, and also to cause a circulation of heated air about said space within the casing, a heater for raising the temperature within the casing and a controlling device for the heater positioned entirely within the casing and in the path of the air circulating therein.

2. A cooking chest of the character described, comprising a non-heat-conducting casing, having a separable portion constituting a cover, and containing partitions arranged to define a space available upon the removal of the cover to receive a food-containing vessel, and also to cause a circulation of heated air about said space within the casing, a heater for raising the temperature within the casing and a controlling device for the heater positioned entirely within the casing and in the path of the air circulating therein, one of the circulating partitions being located between the controlling device and the space for the food-containing vessel.

3. A cooking chest of the character described comprising a non-heat-conducting casing, having a separable portion constituting a cover, and containing partitions arranged to define a space available upon the removal of the cover to receive a food-containing vessel, and also to cause a circulation of heated air about said space within the casing, a burner exterior to the casing, a heat transmitting element exposed on one side to the hot gases from the burner, and on the other side extending within the casing and lying in the path of the air which circulates within the casing, and a controlling device for the burner arranged within the casing.

4. A cooking chest of the character described, comprisng a non-heat-conducting casing, partitions arranged within said casing to define an open space available to receive a food-containing vessel, and also to cause a circulation of the heated air about said space within the casing whereby the circulating air will come into direct contact with the vessel, a heater for raising the temperature within the casing and a controlling device for the heater, said controlling device being responsive to variations in temperature and being exposed solely to the air circulating within the casing.

In testimony thereof I have signed my name to this specification in the presence of two subscribing witnesses.

HUGO JUNKERS.

Witnesses:
 EMIL WERGIEN,
 HERMANN TISCHER.